United States Patent
Bonnet

(10) Patent No.: US 10,972,186 B2
(45) Date of Patent: Apr. 6, 2021

(54) METHOD FOR TRANSMITTING DATA SYNCHRONOUSLY FROM AN ELECTRONIC DEVICE TO AN ELECTRONIC WATCH

(71) Applicant: ETA SA Manufacture Horlogere Suisse, Grenchen (CH)

(72) Inventor: Thierry Bonnet, Geneva (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 16/499,638

(22) PCT Filed: Mar. 28, 2018

(86) PCT No.: PCT/EP2018/057901
§ 371 (c)(1),
(2) Date: Sep. 30, 2019

(87) PCT Pub. No.: WO2018/197142
PCT Pub. Date: Nov. 1, 2018

(65) Prior Publication Data
US 2020/0044736 A1   Feb. 6, 2020

(30) Foreign Application Priority Data
Apr. 25, 2017   (EP) .................................... 17167994

(51) Int. Cl.
*H04B 10/54*   (2013.01)
*G04G 21/00*   (2010.01)
(Continued)

(52) U.S. Cl.
CPC .......... *H04B 10/541* (2013.01); *G04C 11/02* (2013.01); *G04G 5/00* (2013.01); *G04G 21/00* (2013.01);
(Continued)

(58) Field of Classification Search
CPC .............. H04B 10/541; H04B 10/6165; H04B 10/0795; H04B 10/114; H04B 10/1143;
(Continued)

(56) References Cited

U.S. PATENT DOCUMENTS 7,437,077 B2 * 10/2008 Wirth ..................... G02B 26/06
                                                        250/201.9
9,853,740 B1 * 12/2017 Bortz ................... H04B 10/691
(Continued)

FOREIGN PATENT DOCUMENTS

CN         105723286 A      6/2016
CN         106054588 A     10/2016
(Continued)

OTHER PUBLICATIONS

International Search Report dated Jun. 27, 2018 in PCT/EP2018/057901 filed on Mar. 28, 2018.
(Continued)

*Primary Examiner* — Abbas H Alagheband
(74) *Attorney, Agent, or Firm* — Oblon, McClelland, Maier & Neustadt, L.L.P.

(57) ABSTRACT

A method for transmitting data from an electronic device to an electronic watch, including the following steps: emitting a sequence of light signals with a light source of the electronic device, each signal having a light-intensity level belonging to a set of at least four light-intensity levels, said sequence corresponding to a code of the data to be transmitted; detecting successive light-intensity levels with a phototransistor of the watch, so as to reconstitute the sequence; and decoding the sequence in order to reconstitute the data, the set of at least four intensity levels being divided into a first portion and a second portion, one light signal in two of the sequence having a light-intensity level belonging (Continued)

to the first portion, the other signals having a light-intensity level belonging to the second portion.

9 Claims, 3 Drawing Sheets

(51) Int. Cl.
| | |
|---|---|
| *H04B 10/114* | (2013.01) |
| *H04N 7/22* | (2006.01) |
| *H04B 10/61* | (2013.01) |
| *G04R 20/26* | (2013.01) |
| *G04G 21/04* | (2013.01) |
| *G04C 11/00* | (2006.01) |
| *G04G 5/00* | (2013.01) |
| *G06F 1/16* | (2006.01) |
| *H04B 10/079* | (2013.01) |
| *H04B 10/116* | (2013.01) |

(52) U.S. Cl.
CPC ............. *G04G 21/04* (2013.01); *G04R 20/26* (2013.01); *G06F 1/163* (2013.01); *H04B 10/0795* (2013.01); *H04B 10/114* (2013.01); *H04B 10/116* (2013.01); *H04B 10/1143* (2013.01); *H04B 10/6165* (2013.01); *H04N 7/22* (2013.01)

(58) Field of Classification Search
CPC ........ H04B 10/116; G04C 11/02; G04G 5/00; G04G 21/00; G04G 21/04; G04R 20/26; G06F 1/163; H04N 7/22; H04W 12/06; H04W 4/02; H04W 76/02; G08C 23/04
USPC .......................................................... 398/130
See application file for complete search history.

(56) References Cited

U.S. PATENT DOCUMENTS

| | | | | |
|---|---|---|---|---|
| 9,993,200 | B2* | 6/2018 | Jeong .................... | A61B 5/681 |
| 10,175,653 | B1* | 1/2019 | Bloom ................ | A44C 5/0007 |
| 2003/0198478 | A1* | 10/2003 | Vrazel ................ | H04B 10/5561 |
| | | | | 398/183 |
| 2005/0147178 | A1* | 7/2005 | Kikuchi .................. | H03M 9/00 |
| | | | | 375/288 |
| 2008/0219675 | A1* | 9/2008 | Yano .................... | H04B 10/541 |
| | | | | 398/140 |
| 2014/0119734 | A1* | 5/2014 | Lundgren .......... | H04B 10/1149 |
| | | | | 398/115 |
| 2015/0222359 | A1* | 8/2015 | Kai ...................... | H04B 10/541 |
| | | | | 398/115 |
| 2016/0266554 | A1* | 9/2016 | Ogasawara ............ | G04C 10/02 |
| 2016/0299475 | A1* | 10/2016 | Baba ..................... | G04R 20/26 |
| 2017/0118639 | A1* | 4/2017 | Beale .................... | H04W 12/06 |
| 2018/0022351 | A1* | 1/2018 | Habu .................... | B60W 40/04 |
| | | | | 701/96 |
| 2018/0061309 | A1* | 3/2018 | Bae .......................... | G04G 3/04 |
| 2018/0116532 | A1* | 5/2018 | Han ..................... | A61B 5/1455 |
| 2018/0183516 | A1* | 6/2018 | Moision ............. | H04B 10/5161 |
| 2018/0191192 | A1* | 7/2018 | Yang ....................... | H02J 50/80 |
| 2019/0238631 | A1* | 8/2019 | Aoyama ............. | H04B 10/116 |
| 2019/0296740 | A1* | 9/2019 | Lin .................... | H03K 19/0175 |

FOREIGN PATENT DOCUMENTS

| | | |
|---|---|---|
| EP | 1 968 215 A2 | 9/2008 |
| EP | 2 903 187 A1 | 8/2015 |
| GB | 2524523 A | 9/2015 |

OTHER PUBLICATIONS

Office Action dated Sep. 15, 2020 issued in corresponding CN patent application No. 201880027071.7 (with English translation).

* cited by examiner

METHOD FOR TRANSMITTING DATA SYNCHRONOUSLY FROM AN ELECTRONIC DEVICE TO AN ELECTRONIC WATCH

CROSS-REFERENCE TO RELATED APPLICATIONS

This application is a United States national stage application of International Application No. PCT/EP2018/057901, filed Mar. 28, 2018, which designates the United States, and claims priority to European Patent Application No. 17167994.7, filed Apr. 25, 2017, and the entire contents of each of the above applications are hereby incorporated herein by reference in entirety.

TECHNICAL FIELD

The present invention relates to the field of electronic watches. It more particularly relates to a method for transmitting data from an electronic device to an electronic watch.

PRIOR ART

The watches referred to as "connected" watches, which are able to communicate with an electronic device such as a smart phone, have, over the last few years, become impossible to ignore in the business of horology. Such a watch may be adjusted manually, in particular via activation of pushbuttons, of crowns and/or of touch controls, this being relatively constraining for the user or the after-sales service tasked with the adjustment.

To avoid these drawbacks, it is now possible to adjust an electronic watch automatically, by equipping it with devices supporting the Bluetooth Low Energy technology or another near-field communication technology. However, these devices are quite complex to implement and require specific communication means and in particular antennae to be incorporated both into the electronic device and into the watch. They must also be certified, this occasioning an additional cost.

In patent application EP16157655, a new way of transferring adjustment data to an electronic watch from an electronic device, typically a smart phone, is proposed, this way of transferring adjustment data being simpler and less expensive than the aforementioned solutions. To allow data to be transferred, the watch includes a phototransistor intended to detect light signals originating from a light source of the electronic device. These light signals encode data by way of a two-state modulation, the two states being the presence or absence of light. However this type of bipolar optical modulation has the drawback of allowing only relatively low transmission rates. Furthermore, the transmission can only be asynchronous, and the operating systems of electronic devices do not allow a perfect stability in the emission frequency to be guaranteed. There is therefore a risk that the emission periods will not be of identical durations, this possibly causing errors in the reception and decoding.

SUMMARY OF THE INVENTION

The aim of the present invention is to remedy the drawbacks presented in the preceding section, by providing an improved optical transmission method.

To this end, the invention relates to a method for transmitting data from an electronic device to an electronic watch, including the following steps:

- emitting a sequence of light signals with a light source of the electronic device, each signal having a light-intensity level belonging to a set of at least four light-intensity levels, said sequence corresponding to a code of the data to be transmitted;
- detecting successive light-intensity levels with a phototransistor of the watch, so as to reconstitute the sequence; and
- decoding the sequence in order to reconstitute the data.

Since the data are encoded in the form of light signals having at least four states, the signals will be said to encode these data via an optical modulation with a least four levels, this modulation being referred to, more simply, as a multi-level optical modulation. By multi, what is therefore meant is a least four.

This method has the advantage of being able to be implemented mainly automatically, without the user having to perform a complex adjustment via crowns, pushbuttons or touch controls for example. Naturally, the method must be initiated, this possibly being done either manually by pressing on a pushbutton, or automatically, for example via a system that is in standby by default and that turns on reception of a certain sequence of flashes. The automatic transmission of data between the electronic device and the electronic watch makes it much easier to program the watch. It also allows the errors or imprecision resulting from a manual configuration to be avoided. It makes it possible for the user to use the more user-friendly interface of the electronic device, typically an application of a smart phone, to select and configure the data to transfer to the watch. All sorts of data may be transmitted by this means, including short messages if the watch has a display functionality. Thus, any of the following may be easily done: the time may be set, the time may be changed, an alarm may be set, the date may be set, or other information such as the phases of the moon, tide times and tidal coefficients, sunset and sunrise times, etc. may be transmitted.

Furthermore, this method has the advantage of not requiring communication antennae (which are expensive, bulky and sometimes incompatible with metal external parts) to be incorporated into the frame or electronic device, the system for communicating optically between the watch and the electronic device consisting merely of a point light source of the light-emitting-diode type and of an optical sensor of the phototransistor type.

Lastly, the method according to the invention is particularly advantageous in that it allows synchronous transmission, as explained below.

Specifically, emitting light signals at at least four light-intensity levels allows a clock signal to be transmitted in addition to the data. In each clock period, one portion of the data (for example one or more bits) is transmitted with the phase (high or low state) of the clock. In particular, when the clock is in the high state, the data portion is coded in certain light-intensity levels, whereas when the clock is in the low state, said data portion is coded in other light-intensity levels. Using threshold levels, it is therefore possible for the watch to reconstruct the data while taking into account the clock signal that is also transmitted.

Thus, in one embodiment, the set of at least four intensity levels is divided into a first portion and a second portion, one light signal in two of the sequence having a light-intensity level belonging to the first portion, the other signals having a light-intensity level belonging to the second portion.

The method according to the invention may comprise one or a technically possible combination of the following features.

In one nonlimiting embodiment, the light-intensity levels of the set are regularly distributed over a brightness scale.

In one nonlimiting embodiment, the method includes an additional step of generating feedback on the transmission.

In one nonlimiting embodiment, the step of generating feedback on the transmission comprises emitting a light signal with a light-emitting diode of the watch.

In one nonlimiting embodiment, the step of generating feedback on the transmission comprises positioning displaying means of the watch.

In one nonlimiting embodiment, the method comprises an additional step of analysing an image of the dial of the watch, this image being taken by a video camera of the electronic device following the positioning of the displaying means of the watch.

In one nonlimiting embodiment, the electronic device is portable, and in particular a smart phone or an electronic tablet.

By "portable electronic device", what is meant is an electronic device, also called a user terminal, capable of being carried and transported by a user, and of remaining functional during its transportation. This is for example the case of a smart phone. Naturally, devices requiring a mains supply, for example desktop computers, are excluded from this definition. Combinations of devices, for example a portable computer to which a peripheral is connected by a wireless or wired link, are also excluded from this definition.

This method has the advantage of requiring very little hardware: a portable device of the smart-phone type with a suitable mobile application is all that is required to implement it. The method does not require dedicated hardware, such as a sensor to be plugged into a computer, or bulky hardware to be used. Anybody (for example a horologist) with a smart phone having the right application could implement the method.

In one nonlimiting embodiment, the light source is a zone of a display screen of the electronic device.

In one nonlimiting embodiment, the light source is a light-emitting diode that also serves as a flash for the electronic device.

BRIEF DESCRIPTION OF THE FIGURES

Details of the invention will become more clearly apparent on reading the following description, which is given with reference to the appended drawings, in which.

DETAILED DESCRIPTION

Figure 1:
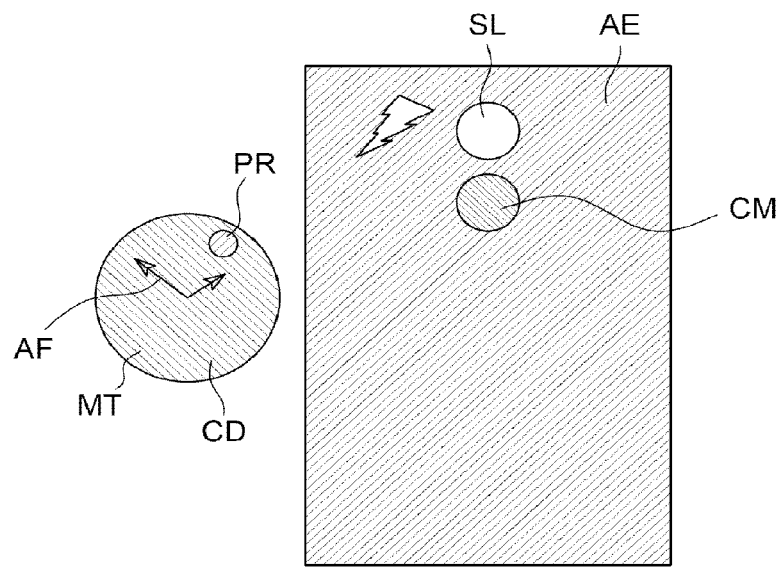
FIG. 1 shows a watch, seen dial-side, receiving, via a phototransistor, a light signal emitted by a light-emitting diode of a smart phone, said diode also being used as a flash in said smart phone, said smart phone being seen rear-side.
Figure 2:
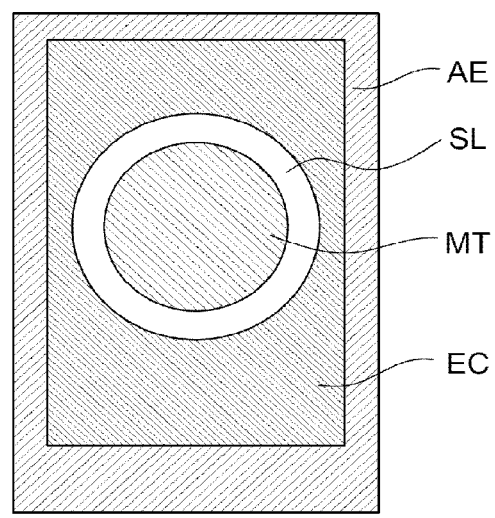
FIG. 2 shows a watch, seen back-side, receiving, via a phototransistor, a light signal emitted by a section of a smart phone screen, the phototransistor being positioned facing said section, the smart phone being seen screen-side.
Figure 5:
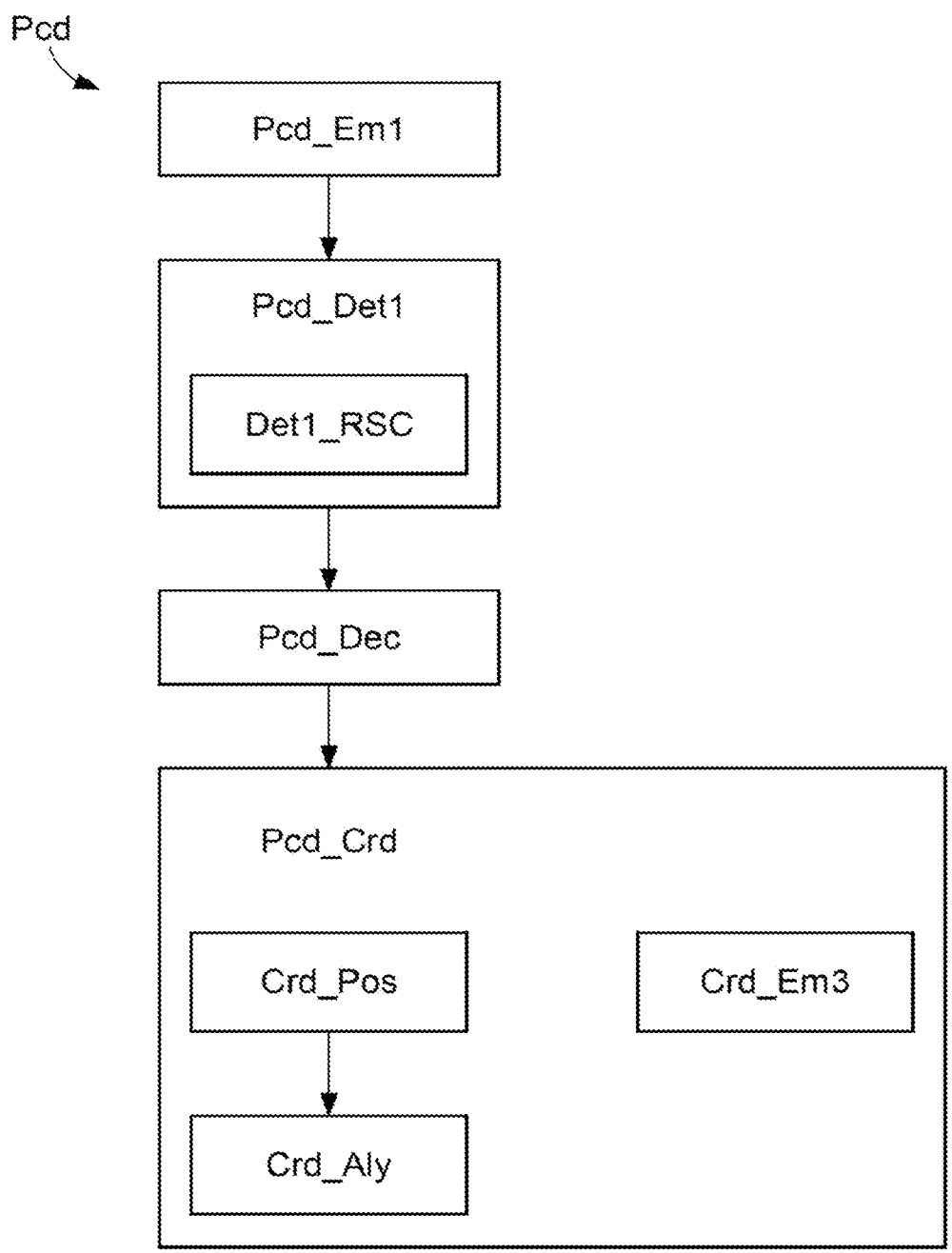
FIG. 5 shows the steps of the method according to one embodiment of the invention

FIGS. 1 and 2 show an electronic watch MT and an electronic device AE that are suitable for implementing the method for transferring data according to the invention, which method is shown in FIG. 5. More particularly, the watch MT is equipped with a phototransistor PR that is connected to a microcontroller (not shown) of the watch MT. The transmitting method consists in emitting (step Pcd_Em1) a sequence of light signals with a light source SL of the electronic device AE at at least four distinct light-intensity levels, in receiving (step Pcd_Det1, Det1_Rsc) the sequence of light signals with the phototransistor PR of the watch MT, and in converting (step Pcd_Dec) the received sequence into an exploitable signal.

In a first configuration shown in FIG. 1, the phototransistor PR is located under the dial CD of the frame watch MT, facing an aperture that lets light pass. In another configuration, the phototransistor PR is located on the side of the back of the watch MT, which is at least partially transparent in order to let light pass or that possesses a removable hatch. Naturally, many other configurations may be envisaged.

Data are transferred from the electronic device AE via the light source SL, for example a flash or a screen EC of said device AE. In the configuration shown in FIG. 1, the electronic device AE is a smart phone and the light signals are emitted via the flash of the smart phone, which forms the light source. Since the flash is located on the rear of the device, it is possible to use the screen EC of the device AE to manage the transferring application using the screen EC of the smart phone during the transfer of data, while also visually monitoring the modifications made to the display of the watch MT.

In the configuration shown in FIG. 2, the electronic device AE is a smart phone and the light signals are emitted via the screen EC of the smart phone. More precisely, the screen EC includes a disc-shaped zone the level of brightness of which is uniform, said zone forming the light source SL. The watch MT is placed directly against or opposite the screen EC of the smart phone, facing the luminous disc. In this case, the application must be configured before the transfer is carried out and, if the dial CD of the watch MT is not visible, a step of inspecting the transfer of data must be carried out after the operation. This configuration has the advantage of being less prone to disruption by exterior light sources than the configuration of FIG. 1.

In one variant implementation of the preceding configuration, the screen EC may be split into two zones in order to limit the scope of the light source to one of the zones of the screen EC. The remaining zone of the screen EC is reserved for the user interface of the application controlling the transfer of data. The transmission of data and the inspection of its execution are thus made easier.

It will be noted that the electronic device AE shown is of portable type, but it could alternatively be a peripheral connected to a desktop computer, for example by a USB link, this peripheral comprising a light source such as described in the preceding paragraphs (a light-emitting diode or a section of a screen of the peripheral). This variant has the advantage of making it possible to increase the symbol rate, which could be limited by the performance of portable electronic devices of the smart-phone type.

The data may be transferred using various types of optical modulation. As mentioned above, a bipolar modulation of NRZ type is easy to implement but has a limited performance. It is therefore advantageous to take advantage of the possibilities offered by the screens or flashes of smart phones (or more generally the screens or flashes of portable electronic devices) to realize a multilevel optical modulation. Specifically, recent flashes and screens are generally able to emit at at least 4 distinct light-intensity levels (one level of which may for example correspond to the "no emission of light" state).

Figure 3:
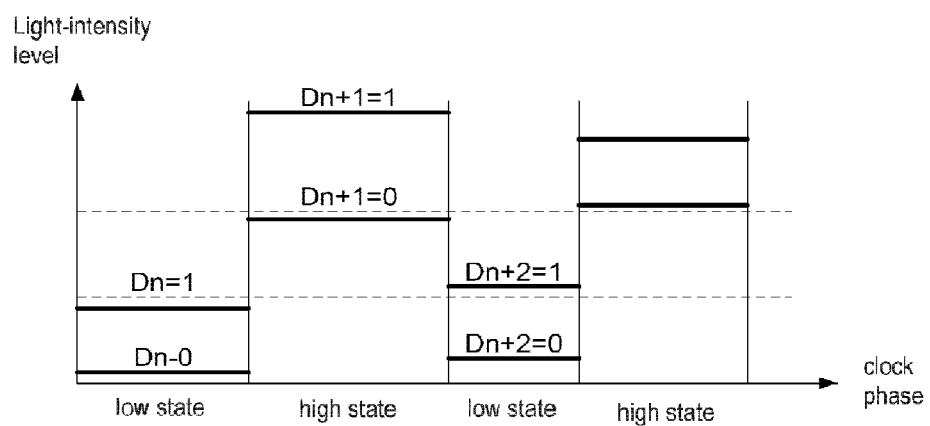
FIG. 3 shows light-intensity levels as a function of the phase of a clock, in the case of a synchronous optical modulation with four light-intensity levels.

The synchronous multilevel modulation according to the invention allows, in each clock period, one portion of the data (for example one bit) but also the phase (low state or high state) of the clock to be transmitted, all this by virtue of only one single sequence of light signals. FIG. 3 shows an example of a four-level synchronous modulation, which allows, in each clock phase, one bit and said phase to be transmitted. In this example, the phases n and n+2 correspond to a low state of the clock, and the phases n+1 and n+3 correspond to a high state of the clock. In a low state of the clock, the bit to be transmitted is coded in the lowest 2 light-intensity levels. In a high state of the clock, the bit to be transmitted is coded in the highest 2 light-intensity levels.

Figure 4:
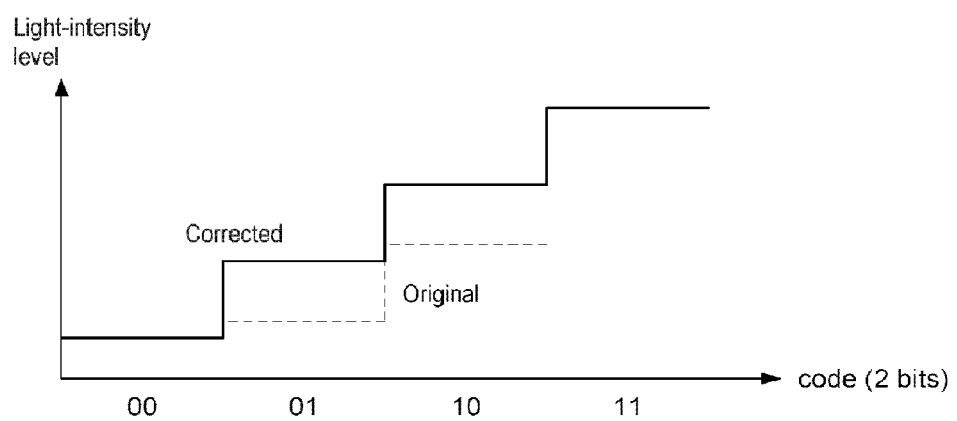
FIG. 4 shows light-intensity levels emitted by a light source of a portable electronic device, before and after a calibrating step of the method according to one embodiment of the invention.

According to one embodiment of the method according to the invention, the transmitting method includes a step of calibrating the light-intensity levels emitted by the light source of the watch MT. These levels are calibrated such that they are regularly distributed with respect to a brightness scale, i.e. such that the brightness difference between one level and the next remains constant. This step allows the distinction of the various brightness levels to be optimized in order to avoid reading errors on the part of the receiver. An example is shown in FIG. 4. This figure shows brightness levels as a function of the data to be encoded, before calibration (curve referenced "original") and after calibration (curve referenced "corrected").

In one embodiment, the method includes a step (step Pcd_Crd) of generating feedback on the transmission, the feedback being produced by the watch MT for the intention of the user or of the electronic device AE. For example, at the end of a transmitting operation, displaying means AF of the watch (for example the hour, minute and second hands of the watch) may be positioned (step Crd_Pos) such as to indicate the success or failure of the transmission. This particular position of the displaying means AF may be noted by the user who is thus informed of the outcome of the transmission. Alternatively, the electronic device AE may, by virtue of its video camera CM and image-analysing means, analyse (step Crd_Aly) the position of the displaying means AF of the watch MT and deduce therefrom whether the transmission was carried out correctly or not. It is also possible to add to the watch MT a light-emitting diode capable of emitting (step Crd_Em3), at the end of a transmission, a short sequence intended to be received by a phototransistor of the electronic device AE. Depending on the sequence, the electronic device AE may determine whether the transmission has executed correctly.

In conclusion, synchronous multilevel optical transmission between an electronic device and a watch allows the risk of transmission errors to be decreased. Naturally, those skilled in the art will be able to produce multiple variants of the presented embodiments without departing from the scope of the claims.

The invention claimed is:

1. A transmitting method for transmitting data from an electronic device to an electronic watch, the method comprising:
    emitting a sequence of light signals with a light source of the electronic device, each light signal having a light-intensity level belonging to a set of at least four light-intensity levels, the sequence of light signals corresponding to an encoded data to be transmitted;
    detecting successive light-intensity levels with a phototransistor of the electronic watch, so as to reconstitute the sequence of light signals; and
    decoding the sequence of light signals in order to reconstitute the transmitted data,
    wherein the set of at least four light-intensity levels is divided into a first portion and a second portion, one light signal in two of the sequence of light signals having a light-intensity level belonging to the first portion, other signals of the sequence of light signals having a light-intensity level belonging to the second portion.

2. The transmitting method according to claim 1, the light-intensity level of the set of at least four light-intensity levels being regularly distributed over a brightness scale.

3. The transmitting method according to claim 1, further comprising an additional step of generating feedback on transmission of the data.

4. The transmitting method according to claim 3, the step of generating the feedback on the transmission of the data comprising emitting a light signal with a light-emitting diode of the watch.

5. The transmitting method according to claim 3, the step of generating feedback on the transmission comprising positioning displaying means of the watch.

6. The transmitting method according to the claim 5, further comprising an additional step of analysing an image of the dial of the watch, the image being taken by a video camera of the electronic device following the positioning of the displaying means of the watch.

7. The transmitting method according to claim 1, wherein the electronic device is portable.

8. The transmitting method according to claim 1, wherein the light source is a zone of a display screen of the electronic device.

9. The transmitting method according to claim 1, wherein the light source is a light-emitting diode that also serves as a flash for the electronic device.

* * * * *